(12) United States Patent
Gerlinger et al.

(10) Patent No.: US 9,587,083 B2
(45) Date of Patent: Mar. 7, 2017

(54) PROCESS FOR PRODUCING POLYMER-SHELL NANOPARTICLES

(71) Applicant: BASF SE, Ludwigshafen (DE)

(72) Inventors: Wolfgang Gerlinger, Limburgerhof (DE); Bernd Sachweh, Meckenheim (DE); Lena Hecht, Karlsruhe (DE); Marion Winkelmann, Ludwigshafen (DE); Heike Schuchmann, Karlsruhe-Durlach (DE)

(73) Assignee: BASF SE, Ludwigshafen (DE)

( * ) Notice: Subject to any disclaimer, the term of this patent is extended or adjusted under 35 U.S.C. 154(b) by 192 days.

(21) Appl. No.: 14/185,967

(22) Filed: Feb. 21, 2014

(65) Prior Publication Data

US 2014/0243450 A1    Aug. 28, 2014

Related U.S. Application Data (60) Provisional application No. 61/767,806, filed on Feb. 22, 2013.

(51) Int. Cl.

| C08G 69/04 | (2006.01) |
|---|---|
| C08K 3/22 | (2006.01) |
| C08F 2/44 | (2006.01) |
| C09C 3/00 | (2006.01) |
| C08K 9/10 | (2006.01) |
| C09C 3/10 | (2006.01) |
| C09C 1/00 | (2006.01) |
| C09C 1/04 | (2006.01) |
| C08F 2/22 | (2006.01) |

(52) U.S. Cl.
CPC .................. *C08K 3/22* (2013.01); *C08F 2/22* (2013.01); *C08F 2/44* (2013.01); *C08K 9/10* (2013.01); *C09C 1/0078* (2013.01); *C09C 1/04* (2013.01); *C09C 3/00* (2013.01); *C09C 3/10* (2013.01); *C01P 2004/84* (2013.01); *C08K 2201/011* (2013.01)

(58) Field of Classification Search
CPC .... C08K 3/22; C08K 3/20; C08K 2003/3072; C08K 5/05; C08K 3/36
See application file for complete search history.

(56) References Cited

U.S. PATENT DOCUMENTS

| 8,512,665 | B2* | 8/2013 | Sachweh | B01F 3/08 423/335 |
|---|---|---|---|---|
| 2003/0232914 | A1* | 12/2003 | Devonport | A01N 25/10 524/501 |
| 2008/0272331 | A1* | 11/2008 | Mohapatra | B01J 13/04 252/70 |
| 2010/0080898 | A1 | 4/2010 | Danner et al. | |
| 2010/0324211 | A1 | 12/2010 | Huether et al. | |
| 2011/0021592 | A1* | 1/2011 | Magdassi | A61K 9/1075 514/406 |
| 2012/0063992 | A1 | 3/2012 | Sachweh et al. | |

FOREIGN PATENT DOCUMENTS

| WO | WO-2008/058958 A2 | 5/2008 |
|---|---|---|
| WO | WO-2008116839 A1 | 10/2008 |
| WO | WO-2010133465 A2 | 11/2010 |

OTHER PUBLICATIONS

Lee, Mei-Hwa, et al., "Synthesis of Spherical Zirconia by Precipitation Between Two Water/Oil Emulsions", J. Eur. Ceram. Soc., vol. 19, No. 15, (1999), pp. 2593-2603.

Landfester, Katharina, "The Generation of Nanoparticles in Miniemulsions", Adv. Mater., vol. 13, No. 10, (2001), pp. 765-768.

Nabih, Nermeen et al., "Water-Based Inorganic/Polymer Hybrid Particles Prepared via a Multiple Miniemulsion Process", Journal of Polymer Science Part A: Polymer Chemistry, vol. 49, (2011), pp. 5019-5029.

* cited by examiner

*Primary Examiner* — Hannah Pak
(74) *Attorney, Agent, or Firm* — Drinker Biddle & Reath LLP (57) ABSTRACT

The invention provides a continuous process for producing polymer-shell nanoparticles, especially in the form of aqueous dispersions, using a high-pressure homogenizer.

23 Claims, 1 Drawing Sheet

PROCESS FOR PRODUCING POLYMER-SHELL NANOPARTICLES

CROSS-REFERENCE TO RELATED APPLICATIONS

This application claims benefit (under 35 USC 119(e)) of U.S. Provisional Application Ser. No. 61/767,806, filed Feb. 22, 2013, which is incorporated herein by reference in its entirety.

BACKGROUND OF THE INVENTION

The present invention relates to a process for producing polymer-shell nanoparticles, especially in the form of aqueous dispersions, and to the production of suspoemulsions which are converted to the aqueous dispersions of the nanoparticles.

The controlled formation and structuring of polymer-shell nanoparticles, especially of nanoparticles with core-shell structure, is of particular interest in order to achieve particular properties of the nanoparticles for highly specialized uses. Coated nanoparticles are of interest for numerous applications, for example as pigments in colorant compositions or as catalysts. The polymer coating prevents the agglomeration of the particles, which leads to a higher color intensity or an improved catalyst performance. In the medical field of application, marker substances are polymer-coated in order to suppress damaging effects of the particles on the organism. In addition, the polymer coating of the particles can serve for protection from external influences on the particles, for example corrosion, oxidation, reduction, water inter alia. It is also possible to modify properties, for example the conductivity of coated particles. One possibility here is, for instance, coated nanoparticles as hybrid materials for printed electronics, consisting of semiconductive or conductive polymers with semiconductive or conductive inorganic particles. This gives rise to a broad field of use for nanoparticles with core-shell structure in optical, electronic, chemical, biotechnological and medical systems.

For production of the polymer-shell nanoparticles, emulsion polymerization processes are frequently used, since these allow the formation of structured nanoparticles, for instance with a core-sheath or core-shell structure.

Lee et al., J. Eur. Ceram. Soc. 1999, 19, 15, 2593-2603, describe the synthesis of spherical $ZrO_2$ microparticles, wherein two inverse microemulsions comprising precursor substances or reactants in the aqueous disperse phase are mixed and reacted.

K. Landfester, Adv. Mater. 2001, 13, 10, 765-768, describes the production of miniemulsions and the use of miniemulsions in the synthesis of nanoparticles and encapsulated nanoparticles.

WO 2008/058958 describes the production of core-shell particles, wherein an outer layer is applied to solid nanoparticles dispersed in a mini-suspoemulsion, by converting a precursor substance dissolved in the disperse phase in an emulsion process with an emulsion in the disperse phase and thus applying it to the dispersed nanoparticles.

WO 2008/116839 describes a process for high-pressure dispersion of reactive monomers for production of nanoparticle-laden monomer emulsions.

WO 2010/133465 describes a process for producing nanoparticles or nanostructured particles with the aid of a two-emulsion method, wherein particles are produced by controlled coalescence of miniemulsions in a high-pressure homogenizer.

N. Nabih et al., J. Polym. Sci., Part A: Polym. Chem. 2011, 49, 23, 5019-5029, describe the synthesis of inorganic polymer hybrid particles which are produced by a multistep miniemulsion process. However, the process is found to be laborious and not very suitable for a continuous configuration, since the miniemulsions are produced by treatment of conventional emulsions by means of an ultrasound homogenizer, which is unsatisfactory in terms of time consumption and energy expenditure and cannot be incorporated into a continuous process regime.

The processes described in the prior art for production of polymer-shell nanoparticles have the disadvantage that intermediate stabilization of the nanoparticles obtained in an intermediate step is necessary, for example by means of surfactant addition. Moreover, the prior art does not disclose any process for producing polymer-shell nanoparticles using emulsions or suspoemulsions, which can be configured as an integrated continuous process.

It is an object of the invention to provide a process for producing polymer-shell nanoparticles, especially in the form of nanoparticles with core-shell structure which can especially be configured in an economically viable manner as a continuous integrated process, without the need for intermediate stabilization of the nanoparticles.

BRIEF SUMMARY OF THE INVENTION

This object is surprisingly achieved by a process in which a suspoemulsion comprising a coherent water phase, a liquid organic monomer phase emulsified in the water phase and nanoparticles for a substance S which is insoluble in the monomers and the water phase is first produced, the nanoparticles being essentially dispersed in the monomer phase, and then the suspoemulsion is subjected to an emulsion polymerization, the suspoemulsion being provided by first providing a suspension of a substance S which is insoluble in the monomers and the water phase in the monomer phase by the process elucidated here and emulsifying this suspension in the water phase in a mixing chamber, by supplying the water phase at a first pressure p1 through a dispersing nozzle to the mixing chamber arranged immediately beyond the dispersing nozzle and, at the same time, supplying the suspension provided to the mixing chamber beyond the dispersing nozzle at a second pressure p2<p1. This suspoemulsion can then be converted by polymerization to an aqueous dispersion of polymer-shell nanoparticles, from which the nanoparticles can be obtained.

DETAILED DESCRIPTION OF THE INVENTION

Accordingly, a first aspect of the invention relates to a process for producing an aqueous suspoemulsion comprising a coherent water phase, a liquid organic monomer phase emulsified in the water phase and nanoparticles of a substance S which is insoluble in the monomers and the water phase, said nanoparticles being dispersed essentially in the monomer phase, and said process comprising the following steps:

i) providing a suspension of the substance S which is insoluble in the monomers and the water phase in the monomer phase, said provision of the suspension comprising the following steps:
   a) providing a first water-in-oil emulsion (1) in which the aqueous phase comprises a substance (S1) in dissolved form which can be converted to the substance S by means of a substance (S2), and in which the oil phase consists essentially of monomers of the monomer phase;
   b) providing a second water-in-oil emulsion (2) in which the aqueous phase comprises the substance (S2) in dissolved form, and in which the oil phase consists essentially of monomers of the monomer phase;
   c) mixing the first water-in-oil emulsion (1) with the second water-in-oil emulsion (2) and homogenizing the mixture and optionally azeotropically removing the water to obtain the suspension;
ii) emulsifying the suspension provided in step i) in the water phase by mixing the suspension provided in step i) with the water phase in a mixing chamber, wherein, in step ii), the water phase is supplied at a first pressure p1 through a dispersing nozzle to the mixing chamber arranged immediately beyond the dispersing nozzle and, at the same time, the suspension provided in step i) is supplied to the mixing chamber at a second pressure p2<p1 beyond the dispersing nozzle.

The process according to the invention is associated with a number of advantages. For instance, it is possible to dispense with an intermediate stabilization, as described in the prior art, of the nanoparticles by addition of emulsifiers and/or surfactants, and workup of the nanoparticles prior to the inventive mixing of the suspension provided in step i) with the water phase. More particularly, it is unnecessary to remove the water from the mixture obtained by mixing the water-in-oil emulsions (1) and (2) and then homogenizing, which would lead, for example, to agglomeration of the nanoparticles. Moreover, it is possible to work without the addition of a solvent, and there is no need to remove it again. This makes it possible to dispense with energy-intensive, substance-consuming and costly intermediate steps in the production of the polymer-shell nanoparticles. In addition, in step ii), it is possible to dispense with the treatment with the ultrasound homogenizer.

The inventive production of nanoparticles in the emulsion droplets can advantageously achieve a narrow, well-defined size distribution of the polymer-shell nanoparticles, since the size distribution achieved in the nanoparticles correlates strongly with the droplet size distribution of the water-in-oil emulsions (1) and (2). Thus, through the controlled adjustment of the droplet sizes of the water-in-oil emulsions (1) and (2), simple control of the size of the resulting nanoparticles is possible. Each individual droplet serves as a nanoreactor, and the resulting particle size can be controlled through droplet volume and reactant concentration within the emulsion droplet. A particularly high stability of the droplets can be achieved by a combination of emulsifier or surfactant and a reagent for regulation of the osmotic pressure, which is also referred to as a hydrophobe. The latter prevents the Ostwald ripening of the droplets.

Owing to the inventive procedure for emulsification of the suspension provided in step i) in the water phase, the process according to the invention can be applied very efficiently to a large production scale and can additionally be operated as a continuous, integrated process. It thus has great potential for the inexpensive and efficient industrial scale production of polymer-shell nanoparticles. By virtue of supply of the water phase through the dispersing nozzle into the mixing chamber and the feeding of the suspension provided in step i) beyond the dispersing nozzle, problems as frequently occur in these arrangements are avoided. More particularly, it has been found to be favorable to introduce the water phase and not the suspension through the dispersing nozzle into the mixing chamber, in order to avoid abrasion of the mixing nozzle by the particles present in the suspension.

In a second aspect of the invention, the aqueous suspoemulsions obtainable by the process according to the invention serve as the basis of a process for producing aqueous dispersions of polymer-shell nanoparticles.

A second aspect of the invention therefore relates to a process for producing aqueous dispersions of polymer-shell nanoparticles, comprising
   α) provision of a suspension by the above-described process;
   β) emulsion polymerization of the suspoemulsion obtained in step a).

A third aspect of the invention relates to the aqueous dispersions of polymer-shell nanoparticles as such.

A fourth aspect of the invention relates to polymer-shell nanoparticles in the form of a powder, which are obtainable by removing the volatile constituents of the aqueous dispersion of the polymer-shell nanoparticles as described above.

In general terms, emulsions refer to mixtures of at least two incompletely miscible liquids in the region of the miscibility gap thereof. One of the liquids constitutes what is called the inner or disperse phase, which is present in the form of small droplets distributed in the second liquid, called the outer or continuous phase. For stabilization of the droplets, emulsions typically comprise surface-active substances, for example protective colloids or emulsifiers, which facilitate the formation of the droplets and counteract demixing (phase separation).

A distinction is made between oil-in-water emulsions (O/W emulsions) in which droplets of the nonpolar phase (for example oil droplets) are present in the continuous polar phase (for example water phase) and, correspondingly, water-in-oil emulsions (W/O emulsions), which are also called inverse emulsions. Suspoemulsions refer to emulsions in which the coherent phase, as well as the liquid disperse phase, comprises a solid in the form of finely divided particles, for instance in the form of nanoparticles, the solid frequently being present in the disperse liquid phase.

A distinction is also made between conventional emulsions (macroemulsions) and miniemulsions. In macroemulsions, the droplet sizes of the disperse phase are inhomogeneous. The mean droplet size of the disperse phase in macroemulsions is typically above 1000 nm, frequently above 1500 nm and especially in the range from >1500 nm to 1 mm. Macroemulsions are thermodynamically unstable and often separate within a relatively short time.

The term "miniemulsion" refers to an emulsion wherein the disperse phase is in the form of very fine droplets having a mean droplet diameter of less than 1 μm, especially 500 nm, for example in the range from 1 to <1000 nm, especially in the range from 5 to 500 nm. Miniemulsions are obtained, for example, by shear with a high energy input proceeding from two or more mutually immiscible liquids and optionally one or more surface-active substances. The droplets of a miniemulsion can be kept stable over a certain period under particular conditions, such that the production of particles in miniemulsions can be effected by the coalescence of various droplets. The required energy input (for example in a shear process) for production of miniemulsions can be effected, for example, through ultrasound treatment or through use of a high-pressure homogenizer. Accordingly, miniemulsions in which the coherent phase comprises a solid in the form of nanoparticles as well as the liquid disperse phase are referred to as mini-suspoemulsions.

Nanoparticles refer to solid or colloidal particles having a mean particle diameter of not more than 1 μm, especially not more than 500 nm, for example having a mean particle diameter in the range from 1 to 1000 nm, especially 5 to 500 nm. Nanoparticles may, for example, be formed from inorganic or organic polymeric material. Coated nanoparticles may refer to nanoparticles having a polyphasic morphology, especially nanoparticles with core-shell structure or core-shell morphology. If the coated nanoparticles have a polymer shell, these may also be referred to as polymer-shell nanoparticles.

According to the invention, in step i) of the process according to the invention, a suspension or suspoemulsion, especially a mini-suspension or a mini-suspoemulsion, of a substance S which is insoluble in the monomers and the water phase in the monomer phase is provided This suspension of the substance S is generally a water-in-oil suspoemulsion, in which the nanoparticles are dispersed essentially in the water phase, and wherein the water phase constitutes the disperse liquid phase and the monomer phase the coherent phase. It may also be a suspension of the nanoparticles essentially exclusively in the monomer phase, provided that the water is azeotropically removed after the mixing of the water-in-oil emulsion (1) and (2) and the homogenization of the mixture.

The substance S is insoluble in water and generally has, at 20° C. and 1 bar, a water solubility of less than 10 g/l, preferably less than 1 g/l and especially less than 0.1 g/l.

The substance S is generally selected from water-insoluble inorganic halides, hydroxides, oxides, carbonates, sulfates, phosphates, sulfides of metals and metals in elemental form, especially the halides, hydroxides, oxides, carbonates, sulfates, phosphates, sulfides of metals from the group of the alkaline earth metals, the rare earth metals, the metals and semimetals of groups 3 to 12 of the Periodic Table (IUPAC) such as aluminum, gallium, indium, silicon, germanium, tin and lead. The substance S is especially selected from the oxides and hydroxides of zinc, of tin, of titanium, of silicon, of iron, alkaline earth metal sulfates, especially of barium or strontium, alkaline earth metal carbonates, especially of calcium, barium or strontium, and specifically from barium sulfate, zinc hydroxide, titanium hydroxides, tin hydroxide, iron oxide, for example iron(II) oxide and iron(III) oxide, and silicon dioxide.

The monomers used in the process according to the invention may in principle be all monomers which can be polymerized in an emulsion polymerization in the presence of water. The composition of the monomer phase is selected such that it has a miscibility gap with water. Frequently, the monomers of the monomer phase are selected from ethylenically unsaturated monomers. More particularly, monomers of the monomer phase are selected essentially, i.e. preferably to an extent of at least 70% by weight, particularly to an extent of at least 80% by weight and especially to an extent of at least 90% by weight, based on the total amount of the monomers, from monoethylenically unsaturated monomers.

The monomers of the monomer phase are preferably predominantly or completely selected from monoethylenically unsaturated monomers (M1), the water solubility of which at 20° C. and 1 bar is less than 50 g/l. The amount of the monomers (M1) is generally 70 to 100% by weight, preferably 80 to 100% by weight, more preferably 90 to 100% by weight, based on the overall monomer phase.

Examples of suitable monomers (M1) are:

esters of monoethylenically unsaturated $C_3$-$C_6$-monocarboxylic acids with $C_1$-$C_{20}$-alkanols, $C_3$-$C_8$-cycloalkanols, phenyl-$C_1$-$C_4$-alkanols or phenoxy-$C_1$-$C_4$-alkanols, especially the aforementioned esters of acrylic acid and the aforementioned esters of methacrylic acid;

diesters of monoethylenically unsaturated $C_4$-$C_6$-dicarboxylic acids with $C_1$-$C_{20}$-alkanols, $C_3$-$C_8$-cycloalkanols, phenyl-$C_1$-$C_4$alkanols or phenoxy-$C_1$-$C_4$-alkanols, especially the aforementioned esters of maleic acid;

vinylaromatic hydrocarbons, for example styrene, vinyltoluenes, tert-butylstyrene, α-methylstyrene and the like, especially styrene;

vinyl, allyl and methallyl esters of saturated aliphatic $C_2$-$C_{18}$-monocarboxylic acids and α-olefins having 2 to 20 carbon atoms and conjugated diolefins such as butadiene and isoprene.

The prefixes $C_n$-$C_m$-used here and hereinafter specify a range for the number of carbon atoms possible in each case that a radical thus designated or a compound designated thereby may have.

Examples of esters of monoethylenically unsaturated $C_3$-$C_6$-monocarboxylic acids with $C_1$-$C_{20}$-alkanols, $C_3$-$C_8$-cycloalkanols, phenyl-$C_1$-$C_4$-alkanols or phenoxy-$C_1$-$C_4$-alkanols are especially the esters of acrylic acid such as methyl acrylate, ethyl acrylate, n-propyl acrylate, isopropyl acrylate, n-butyl acrylate, 2-butyl acrylate, isobutyl acrylate, tert-butyl acrylate, n-hexyl acrylate, 2-ethylhexyl acrylate, 3-propylheptyl acrylate, decyl acrylate, lauryl acrylate, stearyl acrylate, cyclohexyl acrylate, benzyl acrylate, 2-phenylethyl acrylate, 1-phenylethyl acrylate, 2-phenoxyethyl acrylate, and the esters of methacrylic acid such as methyl methacrylate, ethyl methacrylate, n-propyl methacrylate, isopropyl methacrylate, n-butyl methacrylate, 2-butyl methacrylate, isobutyl methacrylate, tert-butyl methacrylate, n-hexyl methacrylate, 2-ethylhexyl methacrylate, decyl methacrylate, lauryl methacrylate, stearyl methacrylate, cyclohexyl methacrylate, benzyl methacrylate, 2-phenylethyl methacrylate, 1-phenylethyl methacrylate and 2-phenoxyethyl methacrylate.

Examples of diesters of monoethylenically unsaturated $C_4$-$C_6$-dicarboxylic acids with $C_1$-$C_{20}$-alkanols, $C_3$-$C_8$-cycloalkanols, phenyl-$C_1$-$C_4$alkanols or phenoxy-$C_1$-$C_4$-alkanols are especially the diesters of maleic acid and the diesters of fumaric acid, especially di-$C_1$-$C_{20}$-alkyl maleates and di-$C_1$-$C_{20}$-alkyl fumarates such as dimethyl maleate, diethyl maleate, di-n-butyl maleate, dimethyl fumarate, diethyl fumarate and di-n-butyl fumarate.

Examples of vinyl, allyl and methallyl esters of saturated aliphatic $C_2$-$C_{18}$-monocarboxylic acids are vinyl acetate, vinyl propionate, vinyl butyrate, vinyl pivalate, vinyl hexanoate, vinyl 2-ethylhexanoate, vinyl laurate and vinyl stearate, and the corresponding allyl and methallyl esters.

Examples of α-olefins having 2 to 20 carbon atoms are ethylene, propylene, 1-butene, isobutene, 1-pentene, 1-hexene, diisobutene and the like.

Among the monomers (M1), preference is given to the esters of monoethylenically unsaturated $C_3$-$C_6$-monocarboxylic acids, especially the esters of acrylic acid or of methacrylic acid, with $C_1$-$C_{20}$-alkanols, $C_3$-$C_8$-cycloalkanols, phenyl-$C_1$-$C_4$-alkanols or phenoxy-$C_1$-$C_4$-alkanols, diesters of monoethylenically unsaturated $C_4$-$C_6$-dicarboxylic acids with $C_1$-$C_{20}$-alkanols, $C_3$-$C_8$-cycloalkanols, phenyl-$C_1$-$C_4$-alkanols or phenoxy-$C_1$-$C_4$-alkanols, and vinylaromatic hydrocarbons, specifically styrene.

Among the monomers (M1), particular preference is given to the esters of monoethylenically unsaturated $C_3$-$C_6$-monocarboxylic acids, especially the esters of acrylic acid or of methacrylic acid, with $C_1$-$C_{20}$-alkanols, and vinylaromatic hydrocarbons, specifically styrene.

Among the monomers (M1), very particular preference is given to the esters of acrylic acid with $C_2$-$C_{10}$-alkanols (=$C_2$-$C_{10}$-alkyl acrylates), the esters of methacrylic acid with $C_1$-$C_{10}$-alkanols (=al-am-alkyl methacrylates) and vinylaromatic hydrocarbons, specifically styrene.

In a particularly preferred embodiment of the invention, the monomers (M1) are selected from $C_1$-$C_4$-alkyl methacrylates, $C_2$-$C_{10}$-alkyl acrylates, styrene, mixtures of $C_1$-$C_4$-alkyl methacrylates with styrene, mixtures of styrene with $C_2$-$C_{10}$-alkyl acrylates, mixtures of $C_1$-$C_4$-alkyl methacrylates with $C_2$-$C_{10}$-alkyl acrylates, mixtures of $C_1$-$C_4$-alkyl methacrylates with styrene and $C_2$-$C_{10}$-alkyl acrylates.

In a very particularly preferred embodiment of the invention, the monomers (M1) are selected from $C_1$-$C_4$-alkyl methacrylates, specifically methyl methacrylate, mixtures of methyl methacrylate with styrene, mixtures of $C_1$-$C_4$-alkyl methacrylates, specifically methyl methacrylate, with $C_2$-$C_{10}$-alkyl acrylates, mixtures of $C_1$-$C_4$-alkyl methacrylates, specifically methyl methacrylate, with styrene and $C_2$-$C_{10}$-alkyl acrylates, where the proportion of $C_1$-$C_4$-alkyl methacrylates, specifically methyl methacrylate, accounts for at least 50% by weight, based on the total amount of the monomers (M1).

The monomer phase may, as well as the monomers (M1), further comprise monoethylenically unsaturated monomers (M2) having a water solubility of more than 50 g/l at 20° C. and 1 bar. The amount of the monomers (M2) is frequently 0 to 30% by weight, particularly 0 to 20% by weight, especially 0 to 10% by weight, for example 0.01 to 30% by weight, particularly 0.05 to 20% by weight or 0.1 to 10% by weight, based on the total amount of monomers in the monomer phase.

Suitable monomers (M2) are, for example, anionic or acidic monoethylenically unsaturated monomers (M2.1), such as
- monoethylenically unsaturated $C_3$-$C_8$-mono- and $C_4$-$C_8$-dicarboxylic acids, for example acrylic acid, methacrylic acid, crotonic acid, maleic acid, fumaric acid or itaconic acid,
- monoethylenically unsaturated sulfonic acids in which the sulfo group is bonded to an aliphatic hydrocarbyl radical, and salts thereof, such as vinylsulfonic acid, allylsulfonic acid, methallylsulfonic acid, 2-acrylamido-2-methylpropanesulfonic acid, 2-methacrylamido-2-methylpropanesulfonic acid, 2-acrylamidoethane-sulfonic acid, 2-methacrylamidoethanesulfonic acid, 2-acryloyloxyethanesulfonic acid, 2-methacryloyloxyethanesulfonic acid, 3-acryloyloxypropanesulfonic acid and 2-methacryloyloxypropanesulfonic acid and salts thereof,
- vinylaromatic sulfonic acids, i.e. monoethylenically unsaturated sulfonic acids in which the sulfo group is bonded to an aromatic hydrocarbyl radical, especially to a phenyl ring, and salts thereof, for example styrenesulfonic acids such as 2-, 3- or 4-vinylbenzenesulfonic acid and salts thereof,
- monoethylenically unsaturated phosphonic acids in which the phosphonic acid group is bonded to an aliphatic hydrocarbyl radical, and salts thereof, such as vinylphosphonic acid, 2-acrylamido-2-methylpropanephosphonic acid, 2-methacrylamido-2-methylpropanephosphonic acid, 2-acrylamidoethanephosphonic acid, 2-methacrylamidoethanephosphonic acid, 2-acryloyloxyethanephosphonic acid, 2-methacryloyloxyethanephosphonic acid, 3-acryloyloxypropanephosphonic acid and 2-methacryloyloxypropanephosphonic acid and salts thereof,
- monoethylenically unsaturated phosphoric partial esters, especially the partial esters of phosphoric acid with hydroxy-$C_2$-$C_4$-alkyl acrylates and hydroxy-$C_2$-$C_4$-alkyl methacrylates, for example 2-acryloyloxyethyl phosphate, 2-methacryloyloxyethyl phosphate, 3-acryloyloxypropyl phosphate, 3-methacryloyloxypropyl phosphate, 4-acryloyloxybutyl phosphate and 4-methacryloyloxybutyl phosphate and salts thereof.

If the anionic or acidic monomers (M2.1) are present in the salt form thereof, they have an appropriate cation as a counterion. Examples of suitable cations are alkali metal cations such as $Na^+$ or $K^+$, alkaline earth metal cations such as $Ca^{2+}$ and $Mg^{2+}$, and also ammonium ions such as $NH_4^+$, tetraalkylammonium cations such as tetramethylammonium, tetraethylammonium and tetrabutylammonium, and also protonated primary, secondary and tertiary amines, especially those bearing 1, 2 or 3 radicals selected from $C_1$-$C_{20}$-alkyl groups and hydroxyethyl groups, for example the protonated forms of mono-, di- and tributylamine, propylamine, diisopropylamine, hexylamine, dodecylamine, oleylamine, stearylamine, ethoxylated oleylamine, ethoxylated stearylamine, ethanolamine, diethanolamine, triethanolamine, or of N,N-dimethylethanolamine. Preference is given to the alkali metal salts.

Preferred monomers (M2.1) are monoethylenically unsaturated $C_3$-$C_8$-mono- and $C_4$-$C_8$-dicarboxylic acids, specifically acrylic acid and methacrylic acid.

The proportion of the monomers (M2.1) in the monomers of the overall monomer phase will generally not exceed 10% by weight, especially 5% by weight, based on the total amount of monomers in the overall monomer phase. In a preferred embodiment of the invention, the monomers of the overall monomer phase comprise less than 0.1% by weight, based on the total amount of monomers in the overall monomer phase, of monomers (M2.1) or none.

Suitable monomers (M2) are additionally uncharged monoethylenically unsaturated monomers (M2.2), such as
- the amides of the aforementioned monoethylenically unsaturated $C_3$-$C_8$-monocarboxylic acids, especially acrylamide and methacrylamide,
- hydroxyalkyl esters of the aforementioned monoethylenically unsaturated $C_3$-$C_8$-monocarboxylic acids, for example hydroxyethyl acrylate, hydroxyethyl methacrylate, 2- and 3-hydroxypropyl acrylate, 2- and 3-hydroxypropyl methacrylate,
- monoesters of the aforementioned monoethylenically unsaturated $C_3$-$C_8$-mono- and $C_4$-$C_8$-dicarboxylic acid with $C_2$-$C_4$-polyalkylene glycols, especially the esters of these carboxylic acids with polyethylene glycol or alkyl polyethylene glycols, where the (alkyl) polyethylene glycol radical typically has a molecular weight in the range from 100 to 3000;
- N-vinylamides of aliphatic $C_1$-$C_{10}$-carboxylic acids and N-vinyllactams such as N-vinylformamide, N-vinylacetamide, N-vinylpyrrolidone and N-vinylcaprolactam.

Preferred monomers (M2.2) are the amides of the aforementioned monoethylenically unsaturated $C_3$-$C_8$-monocarboxylic acids, especially acrylamide and methacrylamide, and the hydroxyalkyl esters of the aforementioned monoethylenically unsaturated $C_3$-$C_8$-monocarboxylic acids, for example hydroxyethyl acrylate, hydroxyethyl methacrylate, 2- and 3-hydroxypropyl acrylate, 2- and 3-hydroxypropyl methacrylate.

The proportion of monomers (M2.2) in the monomers of the overall monomer phase will generally not exceed 10% by weight, especially 5% by weight, based on the total amount of the monomers in the overall monomer phase.

Examples of further monomers that the monomer phase may comprise are ethylenically unsaturated monomers which have at least 2, for example 2, 3 or 4, ethylenically unsaturated double bonds and which are preferably nonionic ("crosslinkers", hereinafter monomers (M3)). Examples of monomers (M3) (crosslinkers) are:

esters of monohydric unsaturated alcohols such as allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol with one of the aforementioned monoethylenically unsaturated $C_3$-$C_8$-monocarboxylic acids, particularly the esters of acrylic acid or of methacrylic acid, especially the allyl esters such as allyl acrylate and allyl methacrylate, di-, tri- and tetraesters of the aforementioned monoethylenically unsaturated $C_3$-$C_8$-monocarboxylic acids, especially the di-, tri- and tetraesters of acrylic acid or of methacrylic acid, with aliphatic or cycloaliphatic di- or polyols, especially the diesters of acrylic acid or of methacrylic acid with dihydric alcohols, for example alkanols such as 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis(hydroxymethyl)cyclohexane, hydroxypivalic acid neopentyl glycol monoester, 2,2-bis(4-hydroxyphenyl)-propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thiapentane-1,5-diol, polyethylene glycols, polypropylene glycols or polytetrahydrofurans each having molecular weights of 200 to 10 000, and the di-, tri- and tetraesters of acrylic acid or of methacrylic acid with polyhydric polyols such as trimethylolpropane, glycerol, pentaerythritol, 1,2,5-pentanetriol, 1,2,6-hexanetriol, cyanuric acid, sorbitans, sucrose, glucose or mannose;

diesters of the aforementioned monohydric unsaturated alcohols, especially of allyl alcohols, with dibasic carboxylic acids such as malonic acid, tartaric acid, trimellitic acid, phthalic acid, terephthalic acid, citric acid or succinic acid;

linear, branched or cyclic, aliphatic or aromatic hydrocarbons having at least two ethylenically unsaturated double bonds which must not be conjugated in the case of aliphatic hydrocarbons, for example divinylbenzene, divinyltoluene, 1,7-octadiene, 1,9-decadiene, 4-vinyl-1-cyclohexene or trivinylcyclohexane;

acrylamides, methacrylamides and N-allylamines of at least difunctional amines. Such amines are, for example, 1,2-diaminoethane, 1,3-diaminopropane, 1,4-diaminobutane, 1,6-diaminohexane, 1,12-dodecanediamine, piperazine, diethylenetriamine or isophoronediamine; and N,N'-divinyl compounds of urea derivatives, at least difunctional amides, cyanurates or urethanes, for example of urea, ethyleneurea, propyleneurea or tartaramide, for example N,N'-divinylethyleneurea or N,N'-divinylpropyleneurea.

Among the monomers (M3), preference is given to the esters of monohydric unsaturated alcohols with one of the aforementioned monoethylenically unsaturated $C_3$-$C_8$-monocarboxylic acids, especially the esters of acrylic acid or of methacrylic acid, specifically the allyl esters such as allyl acrylate and allyl methacrylate, and the diesters of monoethylenically unsaturated $C_3$-$C_8$-monocarboxylic acids, especially the diesters of acrylic acid or of methacrylic acid with dihydric alcohols, specifically with $C_3$-$C_{10}$-alkanediols such as 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, or with oligoalkylene glycols such as diethylene glycol, triethylene glycol, tetraethylene glycol, dipropylene glycol, tripropylene glycol or tetrapropylene glycol. Among the monomers (M3), particular preference is given to the allyl esters of monoethylenically unsaturated $C_3$-$C_8$-monocarboxylic acids such as allyl acrylate and allyl methacrylate, and the diesters of acrylic acid or of methacrylic acid with $C_3$-$C_{10}$-alkanediols such as 1,4-butanediol diacrylate or 1,6-hexanediol diacrylate, and the diesters of acrylic acid or of methacrylic acid with diethylene glycol, triethylene glycol or tetraethylene glycol.

The proportion of the monomers (M3) in the total amount of the monomers in the monomer phase will generally not exceed 10% by weight, particularly 5% by weight, and especially 3% by weight. In a preferred embodiment of the invention, the overall monomer phase comprises 0.01 to 10% by weight, especially 0.1 to 5% by weight, based on the total amount of the monomers in the monomer phase, of one or more monomers (M3), especially one or more of the monomers (M3) specified as preferred or particularly preferred.

The monomer phase may, as well as the monomers, also comprise one or more organic substances (also called hydrophobes) which have a water solubility below 0.1 g/l at 20° C. and 1 bar and which are soluble in the monomer phase. These substances can be added to prevent Ostwald ripening. Suitable hydrophobes are saturated or aromatic hydrocarbons, for example $C_{10}$-$C_{40}$-alkanes such as dodecane, tetradecane, hexadecane, paraffins, low molecular weight polystyrenes, silicone oils and triglycerides or saturated fatty acids. The substance is used in an amount of 0.01 to 40% by weight, preferably 1 to 10% by weight, based on the overall monomer phase. Suitable hydrophobes are also monoethylenically unsaturated monomers having a water solubility below 0.1 g/l at 20° C. and 1 bar, for example $C_4$-$C_{10}$-alkylstyrenes, $C_6$-$C_{20}$-alphaolefins such as hexadecene, $C_{10}$-$C_{24}$-alkyl esters of monoethylenically unsaturated $C_3$-$C_8$-monocarboxylic acids, especially $C_{10}$-$C_{24}$-alkyl esters of acrylic acid and of methacrylic acid, and the di-$C_6$-$C_{24}$-alkyl esters of $C_4$-$C_8$-dicarboxylic acids.

The liquid organic monomer phase may, as well as the monomers, also comprise additions of organic solvents. The organic monomer phase preferably comprises less than 10% by weight, more preferably less than 5% by weight, of organic solvent. In a preferred embodiment, the organic monomer phase does not comprise any organic solvent, i.e. comprises less than 1% by weight of organic solvent.

The substance S generally accounts for 5 to 60% by weight, particularly 10 to 50% by weight and especially 15 to 40% by weight, based on the total weight of the suspension used in step i). The production parameters are preferably selected such that the mean particle diameter of the substance S in the suspension does not exceed a value of 1000 nm. More particularly, the conditions are selected such that the mean particle diameter of the substance S is in the range from 5 to 500 nm.

The proportion of the monomer phase is typically 40 to 95% by weight, particularly 50 to 90% by weight and especially 60 to 85% by weight, based on the total weight of the suspension. The water content in the suspension is generally below 30% by weight.

For provision of the suspension in step i) of the process according to the invention, a water-in-oil emulsion (1) is mixed and homogenized with a water-in-oil emulsion (2). The composition of the water-in-oil emulsion (1) and of the water-in-oil emulsion (2) is selected so as to give rise to the desired composition of the suspension, optionally after removal of water.

The substances (S1) and (S2) are typically selected such that they react when mixed to give the substance S with precipitation of a solid. Typically, the substances (S1) and (S2) are water-soluble compounds which preferably have a solubility in water of ≥10 g/l at 20° C. and 1 bar.

The substance (S1) is generally selected from water-soluble compounds, especially salts, of metals and transition metals which form sparingly soluble halides, oxides, hydroxides, carbonates, sulfates, phosphates or sulfides in water, and water-soluble compounds of metal or semimetals which can be converted to elemental form in an aqueous environment.

The substance (S1) is especially selected from water-soluble salts and compounds of the alkaline earth metals, of the rare earth metals, of the metals and semimetals of groups 3 to 12 of the Periodic Table (IUPAC) such as aluminum, gallium, indium, silicon, germanium, tin and lead. The substance (S1) is specifically selected from water-soluble salts or compounds of barium, zinc, titanium, tin, iron and silicon, very specifically from barium chloride, zinc sulfate and iron sulfate.

The substance (S1) is generally present in the aqueous phase of the water-in-oil emulsion (1) in a concentration of 0.01 to 3 mol/l, preferably 0.05 to 1 mol/l. The aqueous phase accounts for generally 5 to 70% by weight, preferably 30 to 60% by weight, of the water-in-oil emulsion (1). The monomer phase accounts for generally 30 to 95% by weight, especially 40 to 70% by weight, of the water-in-oil emulsion (1).

The substance (S2) is generally selected from water-soluble salts of inorganic halides, hydroxides, carbonates, sulfates, phosphates, sulfides, especially the halides, hydroxides, carbonates, sulfates, phosphates, sulfides of the alkali metals, specifically of sodium and of potassium, and aqueous solutions of reducing agents such as formic acid, formaldehyde, ascorbic acid, hydrazine and the like, very specifically from potassium sulfate and sodium hydroxide.

The substance (S2) is present in the aqueous phase of the water-in-oil emulsion (2) generally in a concentration of 0.01 to 3 mol/l, preferably 0.05 to 1 mol/l. The aqueous phase accounts for generally 5 to 70% by weight, preferably 30 to 60% by weight, of the water-in-oil emulsion (2). The monomer phase accounts for generally 30 to 95% by weight, especially 40 to 70% by weight, of the water-in-oil emulsion (2).

The substance (S2) is present in the aqueous phase of the water-in-oil emulsion (2) typically in at least a stoichiometric amount, based on the substance (S1). The substance (S2) is present preferably in an up to 20-fold excess, more preferably an up to 10-fold excess, in relation to the substance (S1). More particularly, the substance (S2) is present in a stoichiometric amount in relation to the substance (S1).

The mean diameter of the aqueous droplets of the water-in-oil emulsion (1) is generally not more than 10 μm, preferably not more than 1 μm, and is typically in the range from 10 to 1000 nm and specifically in the range from 50 to 500 nm, determined by means of light scattering.

The mean diameter of the aqueous droplets of the water-in-oil emulsion (2) is generally not more than 10 μm, preferably not more than 1 μm, and is typically in the range from 10 to 1000 nm and specifically in the range from 50 to 500 nm, determined by means of light scattering.

The water-in-oil emulsions (1) and (2) generally comprise one or more surface-active substances, especially one or more emulsifiers. According to the system used, it is possible to use known anionic, cationic or nonionic emulsifiers for. Preferred emulsifiers for the provision of the water-in-oil emulsions (1) and (2) frequently have an HLB value in the range from 2 to 10 and especially in the range from 3 to 8. Preferred emulsifiers for the provision of the water-in-oil emulsions (1) and (2) are nonionic.

Suitable nonionic emulsifiers for the production of the water-in-oil emulsions (1) and (2) are, for example,
- sorbitan fatty acid esters, for example SPAN® emulsifiers
- lecithins and cholesterols
- polysorbates, for example TWEEN® emulsifiers
- fatty acid esters of glycerol or polyglycerol esters, for example Mazol® emulsifiers or PGPR 90
- fatty acid esters of ethylene glycol or polyethylene glycol
- amine alkoxylates, for example Quadrol® (BASF SE)
- copolymers and block copolymers, for example poloxamers (block copolymers of ethylene oxide and propylene oxide, Pluronic®); poloxamines (block copolymers of ethylene oxide and propylene oxide with an ethylenediamine block); polyisobutene-polyamine polymer (Glissopal®, BASF SE).

In a preferred embodiment, for production of the water-in-oil emulsions (1) and (2), at least one W/O emulsifier is added in each case to the continuous phase, which is selected from polyisobutene-polyamine polymer, for example of the Glissopal® type, polyglycerol esters of fatty acids, for example PGPR 90, and sorbitan fatty acid esters, for example SPAN® 80.

The emulsifiers for the production of the water-in-oil emulsions (1) and (2) are generally used in an amount of 1 to 20% by weight, preferably 5 to 15% by weight, based on the overall disperse phase.

The first water-in-oil emulsion (1) is generally provided by homogenizing a mixture of an aqueous solution of the substance (S1) with the monomer phase in a manner known per se, for example by means of a high-pressure homogenizer or a rotor-stator apparatus. However, it is also possible to use a water-in-oil emulsion (1) which has been produced by another known process (for example by ultrasound treatment).

The second water-in-oil emulsion (2) is generally provided by homogenizing a mixture of an aqueous solution of the substance (S2) with the oil phase, in other words the monomer phase in a manner known per se, for example by means of a high-pressure homogenizer or a rotor-stator apparatus. However, it is also possible to use a water-in-oil emulsion (2) which has been produced by another known process (for example by ultrasound treatment).

Preference is given to providing the first and second water-in-oil emulsions (1) and (2) in a high-pressure homogenizer. More particularly, the provision in steps a) and b) is effected in a high-pressure homogenizer using an emulsifying pressure in the range from 10 to 4000 bar, preferably in the range from 40 to 2000 bar, more preferably in the range from 60 to 1000 bar.

The homogenization of the mixture of the first water-in-oil emulsion (1) with the second water-in-oil emulsion (2) in step c) of the process according to the invention is preferably effected by means of a high-pressure homogenizer or a rotor-stator device, especially by means of a high-pressure homogenizer. In this case, the water-in-oil emulsion (1) and the water-in-oil emulsion (2) can first be mixed and then homogenized with one another. It is also possible to perform the mixing of the water-in-oil emulsion (1) with the water-in-oil emulsion (2) and the homogenizing simultaneously, by, for example, feeding the water-in-oil emulsion (1) and the water-in-oil emulsion (2) simultaneously into a homogenizer, for example a high-pressure homogenizer or a rotor-stator device.

More particularly, the homogenization is effected by means of a high-pressure homogenizer. Such a high-pressure homogenizer generally comprises at least one homogenizing nozzle through which the suspension or suspoemulsion to be homogenized is forced under pressure (emulsifying pressure). The high-pressure homogenizer preferably has at least one homogenizing nozzle/homogenizing device selected from the group of flat nozzle, perforated plate, slotted plate, offset nozzle and counterjet disperser, especially from the group of perforated plate, slotted plate and offset nozzle.

In a preferred embodiment of the invention, at least one two-jet nozzle is used in the homogenizing step c). A two-jet nozzle especially comprises a plate with two bores mounted at a particular angle α relative to the plate surface. The liquid passes through the nozzle and is divided into two liquid jets which meet one another behind the bore exits. More particularly, a two-jet nozzle having a diameter (hole diameter) d in the range from 50 to 700 μm, preferably from 50 to 100 μm, and an angle α in the range from 10° to 60°, preferably from 20° to 30°, is used.

In one embodiment of the process according to the invention, the mixing of the water-in-oil emulsion (1) with the water-in-oil emulsion (2) is effected in a high-pressure homogenizer in step c), in which case at least one two-jet nozzle having a diameter (hole diameter) d) in the range from 50 to 700 μm and an angle α in the range from 10° to 60° is used as the homogenizing nozzle.

The coalescence of the droplets through homogenization and thus especially the size distribution of the nanoparticles of the substance S obtained in step i) can especially be controlled by variation of the homogenization conditions, in the case of the high-pressure homogenizer by variation of the emulsification pressure, the geometry of the nozzle or nozzles, of the disperse phase content, of the reactant concentrations in the water-in-oil emulsions (1) and (2), of the emulsification temperature and/or of the droplet size distribution of the water-in-oil emulsion (1) and of the water-in-oil emulsion (2).

In this context, it is possible in principle to use different embodiments of high-pressure homogenizers with different homogenizing nozzles, for instance flat nozzles, perforated plates, slotted plates, offset nozzles or counterjet dispersers. It is also possible to work with combinations of a plurality of identical or different homogenizing nozzles, with buildup of a backpressure.

Typically, the homogenization is effected at temperatures in the range from 5 to 100° C., especially in the range from 10 to 50° C.

If the homogenization is effected by means of a high-pressure homogenizer, the emulsifying pressure is generally 50 to 2000 bar, preferably 100 to 1000 bar, more preferably 200 to 500 bar. The emulsifying pressure refers to the pressure drop over the homogenizing nozzle.

As a result of the precipitation reactions in the emulsion droplets in step c) of the process according to the invention, i.e. as a result of the mixing of the first water-in-oil emulsion (1) with the second water-in-oil emulsion (2) and homogenization of the mixture, for example as stated above by means of rotor-stator systems or preferably by means of high-pressure dispersion, and after optional azeotropic removal of the water, a suspension of nanoparticles is obtained, and these can also be referred to as "core particles" with regard to a subsequent polymerization reaction which is possible in accordance with the invention.

The provision of the suspension may be followed by a step of aging of the nanoparticles of the substance S present in the suspension. For this purpose, the suspension is heated over a period of 1 min to 10 h, preferably 5 min to 2 h, for example 1 h, for example to a temperature in the range from 30° C. to 200° C., preferably in the range from 30 to 100° C. and especially in the range from 60° C. to 90° C. In a particularly preferred embodiment of the process according to the invention, the aging takes place not in a separate process step but in parallel to the polymerization reaction of the monomers for preparation of the polymer-shell nanoparticles.

In the course of aging, substances S selected from hydroxides are converted to the oxide form. The substances S obtained after the aging step may, for example, be zinc oxide, iron oxide, titanium dioxide, cerium oxide, tin oxide or silicon dioxide.

For example, zinc oxide is obtained through the aging step from the zinc hydroxide obtained in step i) of the process according to the invention, and this accounts for at least 90% by weight, preferably at least 99% by weight, of the solid substance in the shell formed by the polymerization of the monomers.

In step ii) of the process according to the invention, the suspension provided in step i) is emulsified in the water phase by mixing the suspension with the water phase in a mixing chamber. It is essential that the water phase, which comprises essentially no solids (solids content less than 0.01% by weight), is fed at the pressure p1 through the dispersing nozzle into the mixing chamber which is immediately beyond the dispersing nozzle, whereas the suspension provided in step i) is supplied to the mixing chamber not through the dispersing nozzle but only beyond the dispersing nozzle with a lower pressure p2.

The construction of such an arrangement of dispersing nozzle with mixing chamber and with a feed arranged beyond the dispersing nozzle is described in WO 2008/116839, which is hereby fully incorporated by reference.

Figure 1:
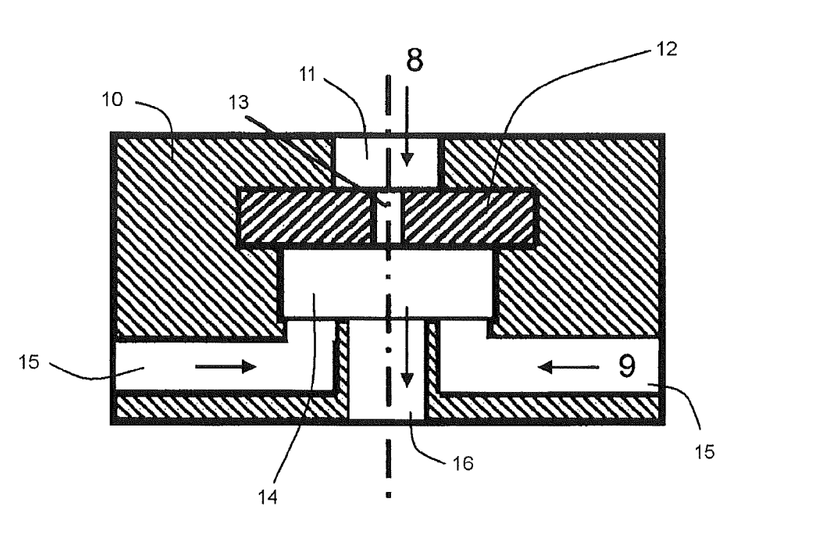
FIG. 1 shows one configuration of the arrangement of dispersing nozzle with mixing chamber and with a feed arranged beyond the dispersing nozzle.

One configuration of the arrangement of dispersing nozzle with mixing chamber and with a feed arranged beyond the dispersing nozzle is described in FIG. 1.

The arrangement described in FIG. 1 consists of a base structure 10 provided in axial direction, i.e. in flow direction of aqueous phase 8, with continuous bore 11. In the bore 11 is disposed a plate 12 having a passage 13, preferably a bore with circular cross section, in flow direction of the aqueous phase upstream of the mixing chamber 14. The passage 13 typically has a cross-sectional area in the range from 0.001 to 0.4 mm$^2$, especially in the range from 0.01 to 0.2 mm$^2$. The mixing chamber typically has a volume in the range from 0.5 to 5.5 cm$^3$, especially in the range from 0.7 to 3.5 cm³. The arrangement additionally has radial channels 15 through which the suspension is supplied to the mixing chamber 14. Through the exit orifice 16, the resulting aqueous suspoemulsion leaves the arrangement and is preferably passed into a reservoir (not shown). The bore 11 and the passage 13 are in concentric arrangement. The base structure 10, the plate 12, the mixing chamber 14 and the exit orifice 16 are preferably likewise in concentric arrangement.

The water phase which flows into the mixing chamber through the dispersing nozzle entrains and mixes with the suspension fed in beyond the mixing nozzle. Beyond the nozzle exit, turbulent kinetic energy rises significantly. The inertia forces in the turbulent flows lead to dispersion and deagglomeration of particle agglomerates in the liquid with simultaneous breakup of the particle agglomerates formed in step i). In addition, the cavitation which occurs in almost all dispersing nozzles brings about a further decrease in agglomerate size. The significant cross-sectional narrowing leads to a rise in the flow rate, such that the pressure in and beyond the nozzle declines to such an extent that cavitation bubbles can form, these contributing to decrease in size. This process regime considerably reduces wear on the nozzles, since only the liquid aqueous phase flows through the nozzle.

The first pressure p1 is generally in the range from 10 to 4000 bar, particularly in the range from 50 to 2000 bar and especially in the range from 100 to 1200 bar.

The second pressure p2 with which the suspension is fed into the mixing chamber beyond the dispersing nozzle is generally in the range from 0.1 to 10 bar, preferably in the range of 0.5 to 5 bar.

The suspension provided in step i) is preferably fed to the mixing chamber at an angle of 30° to 150° relative to the exit direction of the dispersing nozzle.

Useful dispersing nozzles in principle include all nozzles mentioned in connection with high-pressure dispersers, for example flat nozzles, perforated plates, slotted plates and offset nozzles. Preferably, the diameter of the nozzle orifice is in the range from 50 to 700 µm, preferably 70 to 400 µm. A preferred embodiment of a dispersing nozzle is called a perforated plate.

The process according to the invention brings the monomer droplets to the desired droplet size distribution in the course of passage through the mixing chamber of the high-pressure homogenizer. The droplet size distribution established is thus kept virtually constant for the duration of the polymerization which follows. In order to prevent any change in the droplet size distribution after passage through the high-pressure homogenizer, preference is given to using a hydrophobic reagent (hydrophobe) which prevents Ostwald ripening.

Addition of a compound which serves as a polymerization initiator to the reaction mixture initiates the polymerization reaction in the monomer droplets. As a result of the polymerization reaction in droplets, nanoparticles sheathed with a solid polymer shell are obtained.

For stabilization of the aqueous suspoemulsion obtained by the process according to the invention, one or more surface-active substances, for example emulsifiers, suitable for stabilization of oil-in-water emulsions can be added to the suspoemulsion or to the water phase. Preferably, at least one emulsifier is added to the water phase prior to mixing with the suspension provided in step i).

Surface-active substances suitable for stabilization of oil-in-water emulsions comprise both emulsifiers and protective colloids. Emulsifiers, as opposed to protective colloids, are understood to mean surface-active substances whose molecular weight (number average) is typically below 2000 g/mol and especially below 1500 g/mol. Protective colloids in turn are typically water-soluble polymers having a number-average molecular weight above 2000 g/mol, for example in the range from 2000 to 100 000 g/mol and especially in the range from 5000 to 50 000 g/mol. It will be appreciated that it is possible to use protective colloids and emulsifiers in a mixture. The surface-active substances may be anionic, cationic or nonionic. Preference is given to anionic surface-active substances, nonionic surface-active substances and mixtures thereof, especially anionic and nonionic emulsifiers.

The amount of surface-active substance which is used for stabilization of the suspoemulsion is typically in the range from 0.1 to 10% by weight, preferably in the range from 0.2 to 5% by weight, based on 100% by weight of monomer and substance S, or in an amount of 0.01 to 5% by weight, preferably 0.1 to 0.5% by weight, based on the suspension.

In one embodiment of the invention, the suspoemulsion comprises at least one anionic surface-active substance, particularly at least one anionic emulsifier and especially at least one anionic emulsifier having at least one $SO_3X$ group bonded via a carbon atom or oxygen atom, where X is hydrogen or a suitable counterion, for example an alkali metal, alkaline earth metal or ammonium cation. The emulsifiers are generally nonpolymerizable, meaning that they do not have any ethylenically unsaturated groups polymerizable in a free-radical polymerization. Some or all of the emulsifiers may, however, be polymerizable. Such polymerizable emulsifiers comprise ethylenically unsaturated groups and are either nonionic or anionic emulsifiers. Polymerizable nonionic emulsifiers are preferably selected from $C_2$-$C_3$-alkoxylates of alkenols, especially of prop-2-en-1-ol, and monoesters of monoethylenically unsaturated mono- or dicarboxylic acids with poly-$C_2$-$C_3$-alkylene ethers where the degree of alkoxylation in each case is 3 to 100. Polymerizable anionic emulsifiers are preferably selected from the corresponding sulfuric and phosphoric partial esters of the aforementioned nonionic polymerizable emulsifiers.

The nonpolymerizable anionic emulsifiers typically include aliphatic carboxylic acids having generally at least 10 carbon atoms, for example 10 to 20 carbon atoms, and salts thereof, especially the ammonium and alkali metal salts thereof, aliphatic, araliphatic and aromatic sulfonic acids having generally at least 6 carbon atoms, for example 6 to 30 carbon atoms, and salts thereof, especially the ammonium and alkali metal salts thereof, sulfuric monoesters of ethoxylated alkanols and alkylphenols and salts thereof, especially the ammonium and alkali metal salts thereof, and alkyl, aralkyl and aryl phosphates including phosphoric partial esters of alkanols and alkylphenols.

Examples of anionic emulsifiers preferred in accordance with the invention are the salts, especially the alkali metal and ammonium salts, of dialkyl esters of sulfosuccinic acid (alkyl radicals: each $C_4$ to $C_{12}$) such as dibutyl sulfosuccinate, dihexyl sulfosuccinate, dioctyl sulfosuccinate, di(2-ethylhexyl) sulfosuccinate or didecyl sulfosuccinate, alkyl sulfates (alkyl radical: $C_8$ to $C_{18}$) such as lauryl sulfate, isotridecyl sulfate or cetyl sulfate, stearyl sulfate;

sulfuric monoesters of ethoxylated alkanols (EO level: 2 to 30, alkyl radical: $C_{10}$ to $C_{18}$), such as the sulfates of (poly)ethoxylated lauryl alcohol, of (poly)ethoxylated isotridecanol, of (poly)ethoxylated myristyl alcohol, of (poly)ethoxylated cetyl alcohol, of (poly)ethoxylated stearyl alcohol, sulfuric monoesters of ethoxylated alkylphenols (EO level: 2 to 30, alkyl radical: $C_4$ to $C_{18}$), alkylsulfonic acids (alkyl radical: $C_8$ to $C_{18}$) such as laurylsulfonate and isotridecylsulfonate, mono-, di- and trialkylarylsulfonic acids (alkyl radical: $C_4$ to $C_{18}$) such as dibutylnaphthylsulfonate, cumylsulfonate, octylbenzenesulfonate, nonylbenzenesulfonate, dodecylbenzenesulfonate and tridecylbenzenesulfonate, sulfuric monoesters of di- or tristyrylphenol ethoxylates (EO level: 2 to 30), mono- and diesters of phosphoric acid, including mixtures thereof with the corresponding triesters, especially esters thereof with $C_8$-$C_{22}$-alkanols, (poly)ethoxylated $C_8$-$C_{22}$-alkanols, $C_4$-$C_{22}$-alkylphenols, (poly)ethoxylated $C_4$-$C_{22}$-alkylphenols, or (poly)ethoxylated di- or tristyrylphenols.

Examples of suitable anionic emulsifiers are also the compounds of the general formula A shown below (A)

in which $R^1$ and $R^2$ are each hydrogen or $C_4$-$C_{14}$-alkyl and are not both hydrogen, and X and Y are suitable cations, for example alkali metal ions and/or ammonium ions. Preferably, $R^1$ and $R^2$ are each hydrogen or linear or branched alkyl radicals having 6 to 18 carbon atoms and especially having 6, 12 or 16 carbon atoms, where $R^1$ and $R^2$ are not both simultaneously hydrogen. X and Y are preferably sodium, potassium and ammonium ions, particular preference being given to sodium. Particularly advantageous compounds are those in which X and Y are each sodium, $R^1$ is a branched alkyl radical having 12 carbon atoms and $R^2$ is hydrogen or has one of the meanings other than hydrogen specified for $R^1$. Frequently, technical grade mixtures having a proportion of 50 to 90% by weight of the monoalkylated product are used, for example Dowfax®2A1 (trademark of the Dow Chemical Company).

Suitable nonionic emulsifiers are typically ethoxylated alkanols having 8 to 36 carbon atoms, especially 10 to 22 carbon atoms, in the alkyl radical, ethoxylated mono-, di- and trialkylphenols having typically 4 to 12 carbon atoms in the alkyl radicals, the ethoxylated alkanols and alkylphenols typically having an ethoxylation level in the range from 3 to 50.

The provision of the suspoemulsion by the process according to the invention may be followed, in accordance with the invention, by an emulsion polymerization of the monomers.

The emulsion polymerization reaction in the suspoemulsion droplets is generally effected by using what is called a polymerization initiator, i.e. a compound which forms free radicals on decomposition, which may be triggered chemically, thermally or photochemically.

The suitable polymerization initiators include organic azo compounds, organic peroxides and hydroperoxides, inorganic peroxides, and what are called redox initiators. The organic peroxide compounds include, for example, tert-butyl peroxy-2-ethylhexanoate, tert-butyl peroxypivalate, acetyl peroxide, benzoyl peroxide, lauroyl peroxide, tert-butyl peroxyisobutyrate, caproyl peroxide. The hydroperoxides include, as well as hydrogen peroxide, also organic hydroperoxides such as cumene hydroperoxide, tert-butyl hydroperoxide, tert-amyl hydroperoxide and the like. The azo compounds include, for example, 2,2'-azobisisobutyronitrile, 2,2'-azobis(2-methylbutyronitrile), 2,2'-azobis[2-methyl-N-(2-hydroxyethyl)propionamide], 1,1'-azobis(1-cyclohexanecarbonitrile), 2,2'-azobis(2,4-dimethylvaleronitrile), 2,2'-azobis(N,N'-dimethyleneisobutyroamidine), 2,2'-azobis(N,N'-dimethyleneisobutyroamidine), 2,2'-azobis(2-methylpropioneamidine), N-(3-hydroxy-1,1-bishydroxymethylpropyl)-2-[1-(3-hydroxy-1,1-bishydroxymethylpropylcarbamoyl)-1-methylethylazo]-2-methylpropionamide and N-(1-ethyl-3-hydroxypropyl)-2-[1-(1-ethyl-3-hydroxypropylcarbamoyl)-1-methylethylazo]-2-methylpropionamide. The inorganic peroxides include peroxodisulfuric acid and salts thereof such as ammonium, sodium and potassium peroxodisulfate. Redox initiator systems are understood to mean initiator systems comprising an oxidizing agent, for example a salt of peroxodisulfuric acid, hydrogen peroxide or an organic peroxide such as tert-butyl hydroperoxide, and a reducing agent. The reducing agent present therein is preferably a sulfur compound, especially selected from sodium hydrogensulfite, sodium hydroxymethanesulfinate and the hydrogensulfite adduct onto acetone. Further suitable reducing agents are phosphorus compounds such as phosphorous acid, hypophosphites and phosphinates, and also hydrazine or hydrazine hydrate and ascorbic acid. In addition, redox initiator systems may comprise an addition of small amounts of redox metal salts such as iron salts, vanadium salts, copper salts, chromium salts or manganese salts, for example the ascorbic acid/iron (II) sulfate/sodium peroxodisulfate redox initiator system. Particularly preferred polymerization initiators are water-soluble polymerization initiators, especially inorganic peroxides, specifically potassium peroxodisulfate.

These polymerization initiators are generally used in an amount of 0.01 to 5% by weight, especially in an amount of 0.1 to 3% by weight, based on the monomers to be polymerized.

The polymerization reaction and any aging step performed in parallel or separately take place typically at a temperature of 30° C. to 200° C., preferably in the range from 50° C. to 100° C.

The reaction time of the polymerization reaction with optional parallel aging is generally 10 min to 10 h, preferably 1 h to 6 h, more preferably 3 h to 5 h.

The reactors used for the polymerization reaction may in principle be all customary reactors usable for polymerization reactions. If relatively small batches are run, small batch reactors, for example, are suitable. In a particularly preferred embodiment of the invention, a plug flow reactor is used; it is thus possible to perform the production of the polymer-shell nanoparticles within a fully integrated process.

The polymer phase resulting from the polymerization of the monomers generally accounts for 10 to 95% by weight, especially 20 to 90% by weight, based on the total mass of the polymer-shell nanoparticles. Accordingly, the proportion of the substance S in the polymer particles is 5 to 90% by weight, especially 10 to 80% by weight, based on the total mass of the polymer-shell nanoparticles. The solids content of the aqueous dispersion of the polymer-shell nanoparticles obtained in the polymerization is typically in the range from 10 to 70% by weight, especially in the range from 20 to 50% by weight.

The mean diameter of the polymer-shell nanoparticles is typically in the range from 5 to 1000 nm, particularly in the range from 10 to 500 nm, especially in the range from 70 to 400 nm (Sauter diameter). The mean diameter of the polymer-shell nanoparticles in the aqueous dispersion is determined by means of light scattering.

The nanoparticles can be isolated from the dispersion in a manner known per se. Typically, the nanoparticles can be isolated by gravimetric means, for example by filtration or centrifugation.

DESCRIPTION OF FIGURES

FIG. 1: Schematic diagram of the high-pressure homogenizer 2.

The illustrative experimental methods which follow show ways of executing the invention and serve to illustrate the invention. They should not be understood in a restrictive manner.

Illustrative Experimental Methods:
Chemicals used:
styrene (from Merck)
polyglyceryl polyricinoleate (PGPR 90) (Grindsted® PGPR 90, from Danisco, Denmark)
zinc sulfate heptahydrate (from Merck)
sodium hydroxide (from Carl Roth)
hexadecane (≥99%, from Sigma-Aldrich)
sodium dodecylsulfate (SDS) (≥99%, from Carl Roth)
potassium peroxodisulfate (KPS) (from Merck)
distilled water.

High-pressure homogenizer used for production of the water-in-oil emulsions (1) and (2):

High-pressure homogenizer 1: M-110Y Microfluidizer®, from Microfluidics, USA with perforated plates developed in-house (diameter=0.2 mm, length=0.4 mm, inlet and outlet tube diameter=2 mm).

High-pressure homogenizer 2: The arrangement of mixing chamber with plate-type nozzle described in FIG. 1 is used. The arrangement shown in FIG. 1 additionally has a reservoir vessel (not shown) for the aqueous phase, which is connected via a high-pressure pump (not shown) to the bore 11, a second reservoir vessel (not shown), which is connected to the channels 15 via a pump (not shown), and a collecting vessel (not shown), which is connected to the exit orifice 16.

Analytical Methods:
Dynamic light scattering (DLS): Nanotrac®, from Microtrac, USA
Transmission electron microscopy (TEM): Zeiss EM 902, from Carl Zeiss AG, Germany Scanning electron microscopy (REM): Zeiss LEO 1530 Gemini, from Carl Zeiss AG, Germany
EDX analysis: SU8000, from Hitachi with XFlash 5010 (SDD type) detector, from Bruker Experimental Method 1: Production of Zinc Oxide Nanoparticles (Variant 1)

1a) Production of Water-in-Oil Emulsion (1):
5.3 ml of PGPR are dissolved in 94.7 ml of methyl methacrylate while stirring with a magnetic stirrer (300 rpm). While stirring with a magnetic stirrer (300 rpm), 40 ml of a 0.1 molar aqueous zinc sulfate solution are added to 60 ml of the PGPR-methyl methacrylate solution prepared above. The mixture then consists of 57% by volume of methyl methacrylate, 3% by volume of PGPR and 40% by volume of aqueous 0.1 molar zinc sulfate solution. The mixture is introduced into the reservoir vessel of the high-pressure homogenizer 1 and stirred with a propeller stirrer (500 rpm) for 2 min. Subsequently, the mixture is passed through the high-pressure homogenizer 1. The pressure differential $p_1$-$p_2$ is 600 bar (corresponding to an energy density of $E_v$=60 MJ/m$^3$).

1b) Production of the Water-in-Oil Emulsion (2):
5.3 ml of PGPR are dissolved in 94.7 ml of methyl methacrylate while stirring with a magnetic stirrer (300 rpm). While stirring with a magnetic stirrer (300 rpm), 40 ml of a 0.2 molar aqueous sodium hydroxide solution are added to 60 ml of the PGPR-methyl methacrylate solution prepared above. The mixture then consists of 57% by volume of methyl methacrylate, 3% by volume of PGPR and 40% by volume of aqueous 0.2 molar sodium hydroxide solution. The mixture is introduced into the reservoir vessel of the high-pressure homogenizer 1 and stirred with a propeller stirrer (500 rpm) for 2 min. Subsequently, the mixture is passed through the high-pressure homogenizer 1. The pressure differential $p_1$-$p_2$ is 600 bar (corresponding to an energy density of $E_v$=60 MJ/m$^3$).

2a) Production of the Zinc Hydroxide Suspoemulsion (Precipitation in the Emulsion Droplet):
Water-in-oil emulsions (1) and (2) are combined in a beaker and the mixture is stirred for 2 min. Subsequently, the mixture is passed through the high-pressure homogenizer 1. The pressure differential $p_1$-$p_2$ is 1000 bar (corresponding to an energy density of $E_v$=100 MJ/m$^3$). In the course of this operation, zinc hydroxide precipitates in the droplets.

2b) Production of the Zinc Oxide Suspoemulsion (Aging):
For conversion of the zinc hydroxide to zinc oxide (aging), the suspension obtained in step 2a is introduced into a beaker which is placed into a water bath heated to 72° C. This causes the zinc hydroxide to react to give zinc oxide presently suspended in the water droplets of the emulsion.

3) Production of a Zinc Oxide Suspension 1:
The suspoemulsion from step 2b) is transferred to a rotary evaporator and the water present in the mixture is distilled off at 35° C. and 30 mbar. This gives a dispersion of the zinc oxide nanoparticles in methyl methacrylate with PGPR as a dispersion aid.

4) Emulsification:
96.0 g of the zinc oxide suspension obtained after distillative removal of the water are admixed with 2.4 g of hexadecane while stirring (suspension 2 hereinafter). In parallel, the aqueous phase is produced by mixing 143.3 g of distilled water with 0.7 g of sodium dodecylsulfate (SDS). Suspension 2 and the aqueous phase are combined and the mixture is stirred with a magnetic stirrer at 300 rpm for 10 min. This is followed by emulsification with the aid of the high-pressure homogenizer 2. The pressure differential $p_1$-$p_2$ is 1000 bar (corresponding to an energy density of $E_v$=100 MJ/m$^3$).

5) Polymerization:
By dissolving 0.14 g of potassium peroxodisulfate (KPS) in 5.62 g of distilled water, an initiator solution is prepared. In a 100 ml round-bottom flask, the initiator solution is added to 30 g of the emulsion from step 4) under a nitrogen atmosphere. The reaction mixture is stirred with a magnetic stirrer (300 rpm) under a nitrogen atmosphere in a water bath at a water temperature of 72° C. for 4 h.

Experimental Method 2: Production of Zinc Oxide Nanoparticles (Variant 2)

1a) Production of the Water-in-Oil Emulsion (1):
5.3 ml of PGPR are dissolved in 94.7 ml of methyl methacrylate while stirring with a magnetic stirrer (300 rpm). While stirring with a magnetic stirrer (300 rpm), 40 ml of a 0.1 molar aqueous zinc sulfate solution are added to 60 ml of the PGPR-methyl methacrylate solution prepared above. The mixture then consists of 57% by volume of methyl methacrylate, 3% by volume of PGPR and 40% by volume of aqueous 0.1 molar zinc sulfate solution. The mixture is introduced into the reservoir vessel of the high-pressure homogenizer 1 and stirred with a propeller stirrer (500 rpm) for 2 min. Subsequently, the mixture is passed through the high-pressure homogenizer 1. The pressure differential $p_1$-$p_2$ is 600 bar (corresponding to an energy density of $E_v$=60 MJ/m$^3$).

1 b) Production of the Water-in-Oil Emulsion (2):

5.3 ml of PGPR are dissolved in 94.7 ml of methyl methacrylate while stirring with a magnetic stirrer (300 rpm). While stirring with a magnetic stirrer (300 rpm), 40 ml of a 0.2 molar aqueous sodium hydroxide solution are added to 60 ml of the PGPR-methyl methacrylate solution prepared above. The mixture then consists of 57% by volume of methyl methacrylate, 3% by volume of PGPR and 40% by volume of aqueous 0.2 molar sodium hydroxide solution. The mixture is introduced into the reservoir vessel of the high-pressure homogenizer 1 and stirred with a propeller stirrer (500 rpm) for 2 min. Subsequently, the mixture is passed through the high-pressure homogenizer 1. The pressure differential $p_1$-$p_2$ is 600 bar (corresponding to an energy density of $E_v$=60 MJ/m$^3$).

2a) Production of the Zinc Hydroxide Suspoemulsion (Precipitation in the Emulsion Droplet):

Water-in-oil emulsions (1) and (2) are combined in a beaker and the mixture is stirred for 2 min. Subsequently, the mixture is passed through the high-pressure homogenizer 1. The pressure differential $p_1$-$p_2$ is 1000 bar (corresponding to an energy density of $E_v$=100 MJ/m$^3$). In the course of this operation, zinc hydroxide precipitates in the droplets.

3) Emulsification:

The zinc hydroxide-laden emulsion prepared in 2a) is taken and emulsified with water with the aid of the high-pressure homogenizer 2. For this purpose, the continuous water phase is pumped via the main flow (8 in FIG. 1) through the plate (12 in FIG. 1; diameter d=0.2 mm) at a pressure of 1000 bar (corresponding to an energy density of $E_v$=100 MJ/m$^3$), and the emulsion as obtained from 2a) is sucked in the secondary flow (9 in FIG. 1) by the reduced pressure which arises beyond the plate. The secondary flow is regulated by a needle valve in order to obtain an equal volume ratio of main flow to secondary flow per unit time of 1:1.

4) Polymerization:

By dissolving 0.14 g of potassium peroxodisulfate (KPS) in 5.62 g of distilled water, an initiator solution is prepared. In a 100 ml round-bottom flask, the initiator solution is added to 30 g of the emulsion from step 3) under a nitrogen atmosphere. The reaction mixture is stirred with a magnetic stirrer (300 rpm) under a nitrogen atmosphere in a water bath at a water temperature of 72° C. for 4 h. The aging of zinc hydroxide to zinc oxide is effected here during the heating in the water bath in the course of the polymerization reaction.

The invention claimed is:

1. A process for producing an aqueous suspoemulsion comprising a water phase, a liquid organic monomer phase dispersed in and emulsified in the water phase, and nanoparticles of a substance S which is insoluble in the monomers and the water phase, said nanoparticles being dispersed essentially in the monomer phase, said process comprising the following steps:

i) providing a suspension of the substance S which is insoluble in the monomers and the water phase in the monomer phase, said provision of the suspension comprising the following steps:
 a) providing a first water-in-oil emulsion (1) in which the aqueous phase comprises a substance (S1) in dissolved form which can be converted to the substance S by means of a substance (S2), and in which the oil phase consists essentially of monomers of the monomer phase;
 b) providing a second water-in-oil emulsion (2) in which the aqueous phase comprises the substance (S2) in dissolved form, and in which the oil phase consists essentially of monomers of the monomer phase;
 c) mixing the first water-in-oil emulsion (1) with the second water-in-oil emulsion (2) and homogenizing the mixture and optionally azeotropically removing the water to obtain the suspension;
ii) emulsifying the suspension provided in step i) in the water phase by mixing the suspension provided in step i) with the water phase in a mixing chamber, wherein, in step ii), the water phase is supplied at a first pressure p1 through a dispersing nozzle to the mixing chamber, which is arranged immediately beyond the dispersing nozzle, and at the same time, the suspension provided in step i) is supplied to the mixing chamber at a second pressure p2<p1, and at a distance beyond the dispersing nozzle, wherein p1 is in the range from 50 to 2000 bar, p2 is not more than 10 bar, and in step ii) the suspension is supplied to the mixing chamber at an angle in the range from 30 to 150° relative to the exit direction of the dispersing nozzle.

2. The process of claim 1, wherein the monomer phase consists essentially of monomers (M1), the water solubility of which at 20° C. and 1 bar is less than 50 g/l.

3. The process of claim 1, wherein the substance S is selected from the group consisting of water-insoluble inorganic halides, hydroxides, oxides, carbonates, sulfates, phosphates, sulfides of metals and metal in elemental form.

4. The process of claim 1, wherein the mean diameter of the aqueous droplets of the water-in-oil emulsion (1) is not more than 10 μm, and the mean diameter of the aqueous droplets of the water-in-oil emulsion (2) is not more than 10 μm, as determined by means of light scattering.

5. The process of claim 1, wherein the mixture of the first water-in-oil emulsion (1) with the second water-in-oil emulsion (2) is homogenized in step c) by means of a high-pressure homogenizer or a rotor-stator device.

6. The process of claim 1, wherein the provision of the first water-in-oil emulsion (I) comprises a homogenization of a mixture of an aqueous solution of the substance (S1) with the oil phase by means of a high-pressure homogenizer or a rotor-stator device, and the provision of the second water-in-oil emulsion (2) comprises a homogenization of a mixture of an aqueous solution of the substance (S2) with the oil phase by means of a high-pressure homogenizer or a rotor-stator device.

7. The process of claim 1, wherein the substance (S1) is selected from the group consisting of water-soluble salts of inorganic cations which form halides, oxides, hydroxides, carbonates, sulfates, phosphates or sulfides in water, and water-soluble salts of inorganic cations which can be converted to the elemental form in an aqueous environment.

8. The process of claim 1, wherein the substance (S1) is selected from the group consisting of water-soluble salts of inorganic cations selected from the group consisting of the alkaline earth metals, the rare earth metals, groups 3 to 12 of the Periodic Table (IUPAC), aluminum, gallium, indium, silicon, germanium, tin and lead.

9. The process of claim 1, wherein the substance (S2) is selected from the group consisting of soluble salts of inorganic halides, hydroxides, carbonates, sulfates, phosphates, sulfides, and aqueous reducing agents.

10. The process of claim 1, wherein the substance (S1) is present in the aqueous phase of the water-in-oil emulsion (1) in a concentration of 0.01 to 3 mol/l.

11. The process of claim 1, wherein the aqueous phase accounts for 5 to 70% by weight of the water-in-oil emulsion (1).

12. The process of claim 1, wherein the substance (S2) is present in the aqueous phase of the water-in-oil emulsion (2) in an at least stoichiometric amount, based on moles of substance (S1).

13. The process of claim 1, wherein the aqueous phase accounts for 5 to 70% by weight of the water-in-oil emulsion (2).

14. The process of claim 1, wherein the monomers of the monomer phase are selected from ethylenically unsaturated monomers.

15. The process of claim 1, wherein at least 80% by weight of the monomers of the monomer phase are selected from monoethylenically unsaturated monomers.

16. The process of claim 1, wherein at least 80% by weight of the monomers (M1) of the monomer phase are selected from the group consisting of monoethylenically unsaturated aromatic hydrocarbons, $C_1$-$C_{20}$-alkyl esters and $C_3$-$C_{10}$-cycloalkyl esters of monoethylenically unsaturated $C_3$-$C_6$ monocarboxylic acids, $C_1$-$C_{20}$-dialkyl esters and di-$C_3$-$C_{10}$-cycloalkyl esters of monoethylenically unsaturated $C_4$-$C_6$ dicarboxylic acids, vinyl and allyl esters of $C_1$-$C_{20}$-alkanecarboyxlic acids, monounsaturated olefins and butadiene.

17. The process of claim 1, wherein the monomer phase comprises at least one substance which is soluble in the monomers (M1) and has a water solubility below 0.1 at 20° C. and 1 bar.

18. A process for preparing aqueous dispersion of polymer-shell nanoparticles, comprising
providing a suspoemulsion that includes a water phase, a liquid organic monomer phase dispersed in and emulsified in the water phase, and nanoparticles of a substance S, the nanoparticles being insoluble in the monomer phase and the water phase, and are dispersed essentially in the monomer phase, the suspoemulsion prepared by a process comprising:
i) providing a suspension of the substance S which is insoluble in the monomers and the water phase in the monomer phase, said provision of the suspension comprising the following steps:
 a) providing a first water-in-oil emulsion (1) in which the aqueous phase comprises a substance (S1) in dissolved form which can be converted to the substance S by means of a substance (S2), and in which the oil phase consists essentially of monomers of the monomer phase;
 b) providing a second water-in-oil emulsion (2) in which the aqueous phase comprises the substance (S2) in dissolved form, and in which the oil phase consists essentially of monomers of the monomer phase;
 c) mixing the first water-in-oil emulsion (1) with the second water-in-oil emulsion (2) and homogenizing the mixture and optionally azeotropically removing the water to obtain the suspension;
ii) emulsifying the suspension provided in step i) in the water phase by mixing the suspension provided in step i) with the water phase in a mixing chamber, wherein, in step ii), the water phase is supplied at a first pressure p1 through a dispersing nozzle to the mixing chamber, which is arranged immediately beyond the dispersing nozzle, and at the same time, the suspension provided in step i) is supplied to the mixing chamber at a second pressure p2<p1, and at a distance beyond the dispersing nozzle; and conducting an emulsion polymerization of the suspoemulsion, wherein p1 is in the range from 50 to 2000 bar, p2 is not more than 10 bar, and in step ii) the suspension is supplied to the mixing chamber at an angle in the range from 30 to 150° relative to the exit direction of the dispersing nozzle.

19. The process of claim 1, wherein p2 in the range from 0.5 to 5 bar.

20. The process of claim 4, wherein the mean diameter of the aqueous droplets of the water-in-oil emulsion (1) is not more than 1 μm, determined by means of light scattering.

21. The process of claim 1, wherein the mean diameter of the aqueous droplets of the water-in-oil emulsion (2) is not more than 1 μm, determined by means of light scattering.

22. The process of claim 18, wherein the substance (S2) is present in the aqueous phase of the water-in-oil emulsion (2) in an at least stoichiometric amount, based on moles of substance (S1).

23. A process for preparing aqueous dispersions of polymer-shell nanoparticles, comprising
providing a suspoemulsion that includes a water phase, a liquid organic monomer phase dispersed in and emulsified in the water phase, and nanoparticles of a substance S, the nanoparticles being insoluble in the monomer phase and the water phase, and are dispersed essentially in the monomer phase, the suspoemulsion prepared by a process comprising:
i) providing a suspension of the substance S which is insoluble in the monomers and the water phase in the monomer phase, said provision of the suspension comprising the following steps:
 a) providing a first water-in-oil emulsion (1) in which the aqueous phase comprises a substance (S1) in dissolved form which can be converted to the substance S by means of a substance (S2), and in which the oil phase consists essentially of monomers of the monomer phase;
 b) providing a second water-in-oil emulsion (2) in which the aqueous phase comprises the substance (S2) in dissolved form, and in which the oil phase consists essentially of monomers of the monomer phase;
 wherein the substance S is selected from the group consisting of water-insoluble inorganic halides, hydroxides, oxides, carbonates, sulfates, phosphates, or sulfides of metals, or a metal in elemental form, and the mean diameter of the aqueous droplets of the water-in-oil emulsion (1), and the aqueous droplets of the water-in-oil emulsion (2) is not more than 10 μm, as determined by means of light scattering,
 c) mixing the first water-in-oil emulsion (1) with the second water-in-oil emulsion (2) and homogenizing the mixture and optionally azeotropically removing the water to obtain the suspension;
ii) emulsifying the suspension provided in step i) in the water phase by mixing the suspension provided in step i) with the water phase in a mixing chamber,
wherein, in step ii), the water phase is supplied at a first pressure p1 through a dispersing nozzle to the mixing chamber, which is arranged immediately beyond the dispersing nozzle, and at the same time, the suspension provided in step i) is supplied to the mixing chamber at a second pressure $p2<p1$, and at a distance beyond the dispersing nozzle; and conducting an emulsion polymerization of the suspoemulsion, wherein p1 is in the range from 50 to 2000 bar, p2 is not more than 10 bar, and in step ii) the suspension is supplied to the mixing chamber at an angle in the range from 30 to 150° relative to the exit direction of the dispersing nozzle.

* * * * *